United States Patent [19]
Masutomi et al.

[11] Patent Number: 5,362,470
[45] Date of Patent: Nov. 8, 1994

[54] ULTRAFINE GOLD AND/OR SILVER CHALCOGENIDE AND PRODUCTION THEREOF

[75] Inventors: Haruhiko Masutomi, Hino; Naoko Uchida, Tokyo; Hirofumi Ohtani, Hino; Kazuyoshi Ichikawa, Tokyo, all of Japan

[73] Assignee: Konica Corporation, Tokyo, Japan

[21] Appl. No.: 888,636

[22] Filed: May 27, 1992

[30] Foreign Application Priority Data

May 30, 1991 [JP] Japan .................. 3-127516

[51] Int. Cl.$^5$ .................. C01B 19/04; C09K 11/02
[52] U.S. Cl. .................. 423/509; 423/561.1; 423/604; 252/301.4 S
[58] Field of Search .................. 423/509, 561.1, 604; 252/301.4 S

[56] References Cited

U.S. PATENT DOCUMENTS

| | | | |
|---|---|---|---|
| 2,609,292 | 9/1952 | Waller et al. | 95/2 |
| 3,023,081 | 2/1962 | Kulifay | 423/509 |
| 3,288,561 | 11/1966 | Mellgren et al. | 423/509 |
| 4,289,733 | 9/1981 | Saito et al. | 422/227 |
| 5,162,106 | 11/1992 | Kunaa et al. | 423/561.1 |

FOREIGN PATENT DOCUMENTS

| | | |
|---|---|---|
| 0366181 | 5/1990 | European Pat. Off. |
| 544990 | 10/1922 | France |
| 959749 | 4/1950 | France |
| 2556884 | 6/1976 | Germany |
| 2556885 | 6/1976 | Germany |
| 2944092 | 5/1981 | Germany |
| 32514 | 8/1972 | Japan ..... 423/561.1 |

*Primary Examiner*—Gary P. Straub
*Attorney, Agent, or Firm*—Finnegan, Henderson, Farabow, Garrett & Dunner

[57] ABSTRACT

A method for manufacturing an ultrafine gold and/or silver chalcogenide being used for the sensitivity speck seeding sensitization method is disclosed. The gold and/or silver compound, and a water-soluble chalcogenide are mixed into a protective colloid solution under prescribed condition. The light-sensitive photographic material obtained by this method has a high sensitivity and low fog property.

6 Claims, 4 Drawing Sheets

ULTRAFINE GOLD AND/OR SILVER CHALCOGENIDE AND PRODUCTION THEREOF

FIELD OF THE INVENTION

The present invention relates to an ultrafine gold and/or silver chalcogenide involved in sensitization of silver halide used in photographic light-sensitive materials, specifically gold sulfide, silver sulfide and a gold-silver complex sulfide, a method of production thereof in liquid suspension and an apparatus for production thereof.

BACKGROUND OF THE INVENTION

In photographic chemistry, sulfur sensitization with a sulfur compound, gold-sulfur sensitization with a gold-sulfur compound and gold sensitization with a gold compound are widely known as sensitizing methods for silver halide grains.

It is a well-known practice to chemically sensitize silver halide emulsion; electron microscopic observation of silver sulfide resulting from chemical sensitization has been reported, for example, by G. C. Furnell, P. B. Flint and D.C. Berch [Journal of Photographic Science, 25, 203 (1977)]. As reported in these reports, the size of fine grains of silver sulfide is very small of the order of several Å to a few dozen Å, and they are abundantly present on silver halide grains.

The basic requirements of the performance of photographic silver halide grains are high sensitivity, low fogging and fine graininess.

A basic approach to the obtainment of high sensitivity emulsion comprising fine grains is to increase the photon efficiency in the light sensitizing process. Possible factors hampering the increase in photon efficiency include the presence of competitive electron traps originating from re-bonding, latent image dispersion, structural failure, lattice defects,etc. Sulfur sensitization and gold-sulfur sensitization are thought to act to provide the electron capturing center in the light sensitizing process. It is therefore important in sensitizing treatments to adjust the size, position and number of sensitivity specks serving as such light sensitization centers. Methods of controlling this position and number are reported or proposed in Japanese Patent Publication Open to Public Inspection (hereinafter referred to as Japanese Patent O.P.I. Publication) Nos. 9344/1986, 40938/1989, 62631/1989, 62632/1989, 74540/1989, 158425/1989, 34/1990 and 298935/1990.

However, all these methods aim at controlling the position of formation of the silver sulfide or gold-silver complex sulfide described above, and their size and number depend on the limited position (area), with no direct control of the size or number of silver sulfide, gold sulfide or complex nuclei thereof.

This is because the grains are very fine at the order of several Å to a few dozen Å as stated above, and because the size and number are significantly affected by the site and area of formation of silver sulfide on the silver halide crystal plane.

On the other hand, some methods have been proposed which are based on techniques different from those of ordinary chemical sensitization.

For example, Japanese Patent O.P.I. Publication No. 93447/1986 describes a sensitizing method in which not more than $10^{-3}$ mol/mol AgX fine grains of silver sulfide or gold sulfide are formed at specific points in silver halide crystals, but it gives no specific description about the size or number thereof.

Japanese Patent O.P.I. Publication No. 198443/1990 describes sensitization of silver halide grains by the addition of fine grains of silver sulfide zol thereto. However, this publication gives no description of the grain size of the silver sulfide zol obtained, describing nothing other than the luminescence spectrum of the silver sulfide zol. Nor is specified the grain size distribution. As recognized commonly, coloring with colloid grains varies widely depending on the size, chemical species and surface condition thereof; it is impossible to specify the size and distribution of colloid grains solely by their spectrum. Therefore, when this method is used, it remains unknown how many specks have been arranged on the silver halide crystal because the grain size is unknown.

As stated above, despite the fact that the size and number of fine grains of silver sulfide, gold sulfide, etc. on silver halide crystals are critical factors in the light sensitizing process, they remain out of control. This is because their size is too small; to date, no one has ever succeeded in controlling the size and number of these grains.

On the other hand, assemblies of 2 to a few hundred atoms, called microclusters, are known, whose substance phase is a transition phase not categorized under any of solid, liquid and gas, in which almost all atoms are located on the surface of the basket-like assembly. For this reason, some electrons are not involved in bonding but generally active in a non-localized state, making the assembly highly reactive at points of particular numbers of atoms (called the magic numbers of microclusters). In short, the size of cluster plays a key role in the activity thereof.

In the 1980's, Richard E. Smalley, Vlandimir E. Bondybey et al. succeeded in forming a cluster by the laser evaporation method.

Another microcluster, stable as a Synthol compound ion, is also known.

Although much remains unknown as to these microclusters and behavior thereof, they draw attention as providing an important hint for silver halide sensitization, sensitivity speck formation in the light sensitizing process, sensitivity speck behavior or growth to developing specks, etc.

SUMMARY OF THE INVENTION

In view of the technical background described above, the object of the present invention is to provide an ultrafine gold and/or silver chalcogenide which can be used for the sensitivity speck seeding sensitization method, in which separately prepared liquid suspensions of sensitivity speck substances with known size and composition are distributed on the silver halide crystal plane at a given density, a method of production thereof and an apparatus for production thereof.

The object described above is accomplished by the method of chalcogenide production wherein a solution of a water-soluble gold compound and/or a silver compound and a solution of a water-soluble chalcogenide are simultaneously added to a flowing protective colloid solution under reaction conditions selected according to the combination of the two seed solutions in a mixing ratio based on the reaction equivalences of the two seed solutions to yield an ultrafine gold and/or silver chalcogenide.

The chalcogenide described above is a sulfur family compound.

The gold and/or silver chalcogenide, particularly gold sulfide, silver sulfide or a gold-silver complex sulfide, obtained by the production method described above, which has an ultrafine grain size of not more than 100 Å on average and is monodispersed to such extent that the coefficient of variance of grain size is preferably not more than 0.16, offers high practical applicability, suiting the object of the present invention. The production method described above is of course preferably applicable to sulfides.

Figure 1:
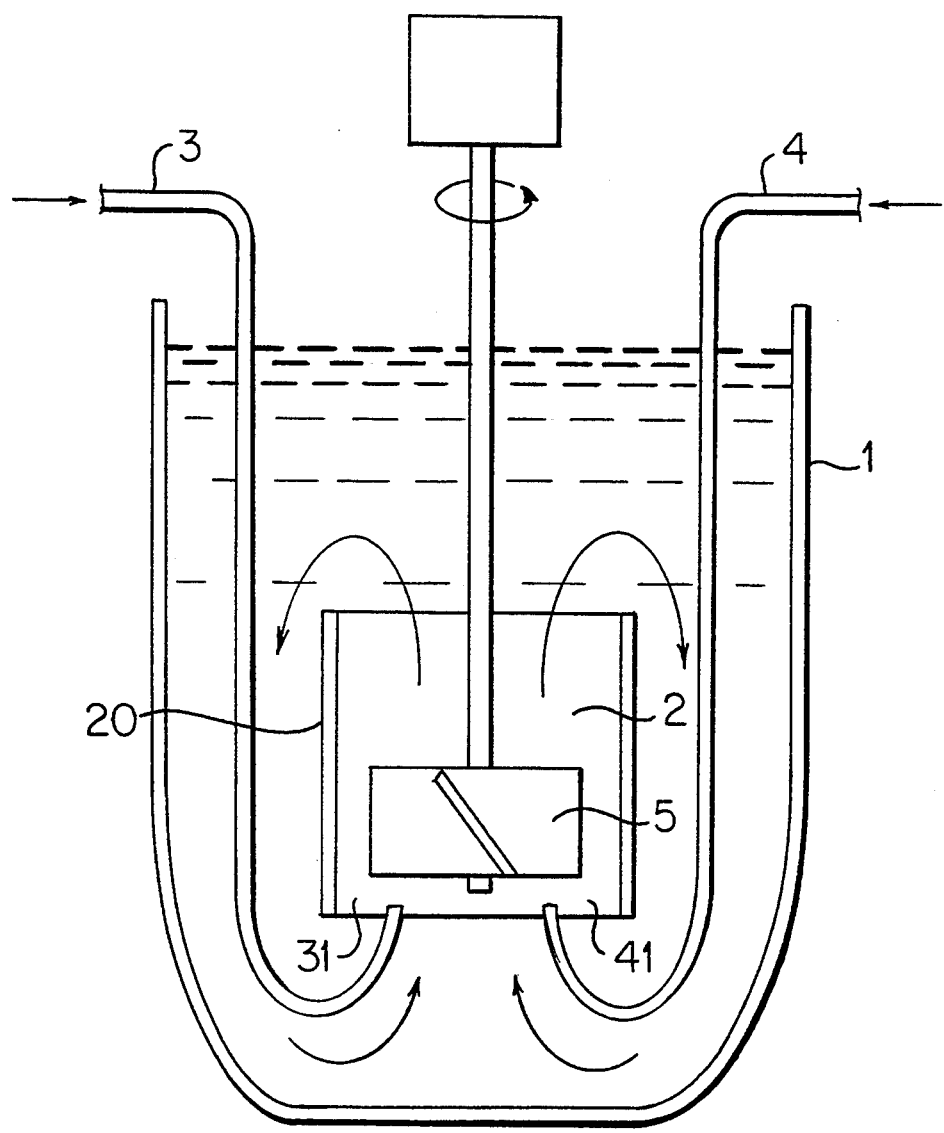
FIGS. 1 and 2 (a–b) are schematic diagrams of axial flow batch reaction apparatus.

In these figures, the numerical symbols respectively denote a reactor (1), a mechanical stirrer (11), a mixer (2), a draft tube (20), an opening (21 and 22), a flow regulating plate (23), a reaction solution supply tube (3 and 4), a sunken nozzle or slit opening (31 and 41), and a mixer stirrer (5).

DETAILED DESCRIPTION OF THE INVENTION

A production apparatus suiting the production method described above is selected. Three types of apparatus for production of ultrafine gold and/or silver chalcogenide are available.

Type 1 is configured with a sunken nozzle, which is immersed in a protective colloid solution filling the reactor and performs separate injection of a solution of a water-soluble gold compound and/or a silver compound and a solution of a water-soluble chalcogenide, and a mixer, which is equipped with a high speed axial flow mechanical stirrer housed therein and in which the compound solution and chalcogenide solution are injected and thinned with the protective colloid solution and simultaneously mixed rapidly, the resulting mixture is discharged into the protective colloid solution in the reactor and subjected to axial flow stirring.

Type 2 is configured with a reactor, which is filled with a protective colloid solution and equipped with a mechanical stirrer, and an outside mixer, which is connected to the reactor via a solution circulating tube and equipped with a mixing chamber having injection slit openings respectively for a solution of a water-soluble gold compound and/or a silver compound, a solution of a water-soluble chalcogenide and, where necessary, a protective colloid solution and with a mechanical stirrer, in which the compound solution, chalcogenide solution and, where necessary, protective colloid solution are simultaneously into the mixing chamber and rapidly mixed therein, and the resulting mixture is circulated and stirred between the reactor and the mixer.

Type 3 is configured with a reactor, which is filled with a protective colloid solution and equipped with a mechanical stirrer, an outside discharge injection tube connected to the reactor, and a mixer, which is equipped with a mixing chamber having injection slit openings respectively for a solution of a water-soluble gold compound and/or a silver compound, a solution of a water-soluble chalcogenide and, where necessary, a protective colloid solution, and with a mechanical stirrer, in which the compound solution, chalcogenide solution and, where necessary, protective colloid solution are simultaneously injected into the mixing chamber and rapidly mixed, and the resulting mixture is continuously discharged into the reactor and stirred therein.

In the production method of the present invention, it is necessary that the solution of a water-soluble gold compound or silver compound or the mixed solution of the two compounds in a selected ratio be prepared in the presence of a sufficient amount of protective colloid to prevent the formation of aggregates whose composition and structure are unknown or changeable at too high compound concentrations.

As for mixing reaction conditions, the optimum levels of pH, pAg, pAu, temperature, protective colloid concentration, reaction time and other factors are selected according to the composition and size of the chalcogenide to be formed in view of the actual sensitizing effect.

It is also preferable to suppress the excess of either component within the range of ±10%, based on reaction equivalence as a reference mixing ratio, in view of the microcluster structure having non-localized electrons and the fact that the presence of a too large amount of the reaction compound not involved in bonding can degrade the activity of the gold and/or silver chalcogenide formed.

The size of the gold and silver chalcogenides formed appears to be significantly affected by adsorption of low molecular substances, interaction with solvents; too complex and severe substance concentration circumstances, such as those of dispersing agents for stable dispersion, are undesirable.

The technique of the present invention described above makes it possible to optionally prepare a gold and/or silver chalcogenides, particularly gold sulfide, silver sulfide or a gold-silver complex sulfide, of not more than 100 Å in grain size, in separate liquid suspension systems, seed it as a sensitivity speck substance with a varying or constant electron trapping capability to silver halide crystals at a given density and obtain the desired sensitivity in a short time with high reliability instead of chemical sensitization. This technique also makes it possible to avoid side reactions such as harmful fogging inevitable in chemical sensitization.

Concerning the constitutional requirements of the present invention, there was a problem to be solved, i.e., it remained impossible to control the size and distribution of ultrafine grains of gold and/or silver chalcogenide because their chemical sensitization requires strictness associated with their fineness. Specifically, the prior art methods are often affected by the base of silver halide grains because the chemical sensitization centers serving as sensitization specks are formed on the surface of the silver halide grains, which hampers efficient control of chemical sensitization due to complication of too many factors. Thus, the present inventors attempted to use a new method in which these complicating factors are first separated, a sensitization speck substance is previously formed singly in a liquid suspension system and seeded onto the silver halide crystals as sensitization specks rather than forming sensitization specks from the chemical sensitization centers on silver halide crystals.

However, with respect to ultrafine grains of gold and/or silver chalcogenide, no records are available even on their size, as stated above, nor has anyone attempted to produce monodispersed grains with narrow distribution. Although the above-mentioned Japanese Patent O.P.I. Publication No. 198443/1990 may be mentioned as a rare case associated with such grains, even this publication does not specify the grain size. Moreover, it described nothing more than very unclear grain formation conditions, e.g., instantaneous addition of silver nitrate to an aqueous solution of sodium sulfide, followed by addition of an inhibitor. In view of these circumstances, the inventors analyzed various methods which had long been employed for production of silver halide grains, and found a useful combination of essential requirements with new consideration. Specifically, the essential requirements are to integrate or divide the resulting chalcogenide grains to a size of sensitivity speck unit aggregates, to provide solution conditions ensuring a regular sensitivity speck atom arrangement (e.g., basket structure for microclusters) without causing excess dissolution or decomposition of the unit aggregates, and to prevent excess flocculation of the unit aggregates to ensure stable dispersion, i.e., to use a protective colloid, to control ion concentration during grain formation, and to employ a reaction apparatus capable of controlling temperature, controlling the amount of addition and performing instantaneous mixing. The inventors made investigations as to these items and succeeded in controlling the grain size of the ultrafine grains and achieving monodispersion.

When monodispersibility is required for the present invention, it is preferable to keep the coefficient of variance below 0.16, as defined as the value obtained by dividing the standard deviation S of grain size by the average grain size r.

Commonly known methods of forming silver sulfide include reaction of hydrogen sulfide and silver nitrate, reaction of sodium sulfide and silver nitrate and reaction of sodium thiosulfate and silver sulfate.

Selenium and tellurium, known to have a sensitizing effect, and mixtures thereof, can be used in place of sulfur; all these substances make it possible to obtain useful sensitivity speck unit aggregates (hereinafter referred to as fine grains) by the use of the method of the present invention. Although any substance can be used as a cationic component of the reaction reagent used for the present invention, as long as it is a water-soluble silver compound, it is the common practice to use an aqueous solution of silver nitrate. As a water-soluble gold compound, chloroauric acid, gold dimethylrhodanine or, where necessary, a mixture of chloroauric acid and rhodan ammon may be used. Examples of aqueous solutions of sulfide as an anionic component include hydrogen sulfide, alkali sulfide, thiourea, thiourea derivatives, rhodanines, oxazolidines, polysulfides, selenoureas and dithiacarbaminic acids.

Some of them are insoluble in water and should be solubilized as far as possible, using acid or another means. This is important in controlling the flocculation of fine grains described below. However, although thiazolylthiourea, for instance, is sparingly soluble in water and easily soluble in methanol, even its solution in methanol permits production of fine grains by the method of the present invention. In this case, such production can be achieved, as long as the amount of methanol does not exceed 10% by weight during and after grain formation. In other words, fine grains can be formed, as long as conditions are set to avoid grain flocculation.

To suppress the flocculation and growth of fine grains of silver sulfide, i.e., to achieve stable dispersion, a protective colloid is used as in the production of photographic emulsion grains. Protective colloid concentration is normally not less than 1% by weight, preferably not less than 2% by weight. When the fine grain density is high, protective colloid concentration is preferably not less than 5% by weight. As protective colloid, gelatin and other synthetic polymers can be used; examples are described in Term IX of Research Disclosure, 176, No. 17643 (December 1978).

Temperature at which the above fine grains are formed is a factor determining the speed of their growth and the number of nuclei formed; usually, the growth speed increases as temperature rises. Therefore, for obtaining finer grains, temperature is preferably under 80° C., more preferably under 60° C., and still more preferably under 40° C. At temperatures below 35° C., it is preferable to use low molecular gelatin with a molecular weight of not more than 30000 because ordinary gelatin is likely to set at these temperatures; for example, the method described in Japanese Patent Application No. 314893/1990, which uses a mixture of high molecular gelatin and low molecular gelatin, is also preferred. For the purpose of reducing the settability, salt and acid may be used.

Among the other parameters of fine grain formation, pH and ion concentration are important in regulating the solubility of said fine grains. These parameters determine the speed of grain growth and the number of nuclei formed so that they are important in obtaining uniform grain size.

A uniform grain size can be obtained by a modification of a production method for monodispersed grains of silver halide crystal. In other words, it is preferable to rapidly grow grains within the range not exceeding the critical supersaturation level by the method described in U.S. Pat. No. 1,535,016 and Japanese Patent Examined Publication Nos. 36890/1973 and 16364/1977, in which the rate of addition of the reaction solution is changed according to the speed of grain growth, or the method described in U.S. Pat. No. 4,242,445 and Japanese Patent O.P.I. Publication No. 15814/1980, in which reaction solution concentration is changed.

For example, when using hydrogen sulfide and silver nitrate, pH may be changed to control hydrogen sulfide dissociation, and silver ion concentration to control the silver ion content in the solution.

Although the size of fine grains is optionally controlled according to the present invention, it is generally known that fogging occurs when the sensitivity speck has too great a grain size; it is preferable to regulate the size of sensitivity speck unit aggregates to not more than 100 Å, more preferable not more than 60 Å.

By mixing the fine grains of gold sulfide, silver sulfide or gold-silver complex sulfide obtained in the manner described above with fine grains of silver halide, the fine grains of silver halide are chemically sensitized by the seeding method relating to the present invention. As for conditions of this chemical sensitization, it can be carried out at ordinary temperatures, though the conditions cannot be determined absolutely, depending on the adsorption conditions for the sensitizing dyes used in combination in the color light-sensitive material and on whether or not it is necessary to limit the sites where the fine grains are adsorbed. When using a sensitizing dye, it may be added at any time, whether before, after or simultaneously with addition of the fine grains. Limitation of sites may be performed after the silver halide has been coated with an adsorbent; a sensitizing dye is suitable for this purpose, but other adsorbents, such as azaindenes and heterocyclic compounds having a mercapto group, are also effective. This site limitation can also be achieved by the use of a solvent for silver halide. Examples of such solvents include thiocyanic acids, thioether and telluroether, with preference given to HSCN, NH$_4$SCN, etc. Although these additives may be added before, after or simultaneously with addition of the fine grains, it is preferable to add them before the fine grains are added. As for how to supply the fine grains to silver halide, they may be added instantaneously or gradually over a long period.

The reaction apparatus used for the present invention is described below.

Three types are available: the axial flow batch type, in which axial flow stirring is conducted, the circulatory batch type, in which circulatory stirring is conducted, and the continuous inflow type, in which a mixture is fed. Axial flow batch type FIG. 1 is a schematic diagram of an axial flow batch type reaction apparatus.

Figure 2A:
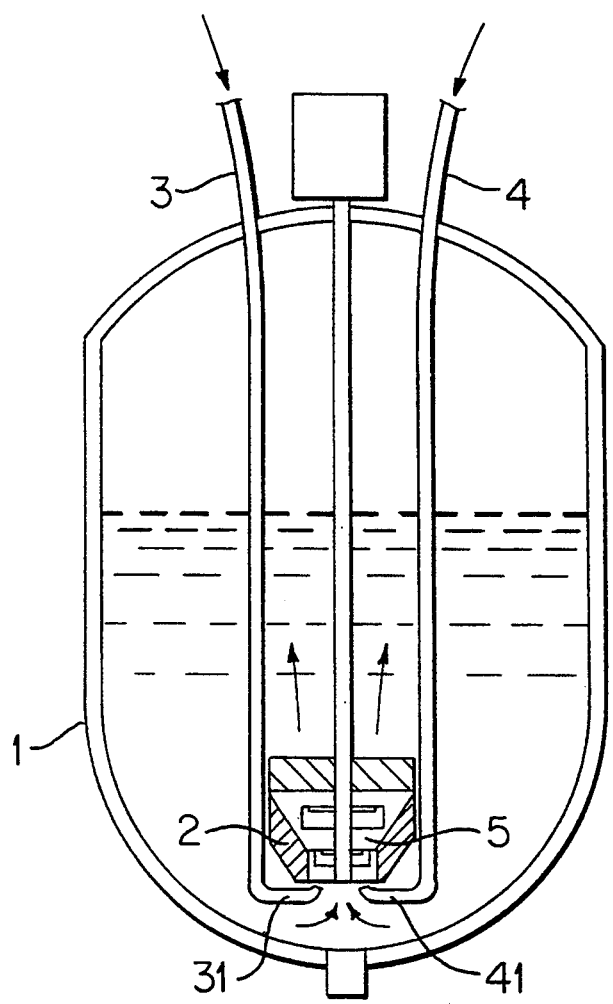
Figure 2B:
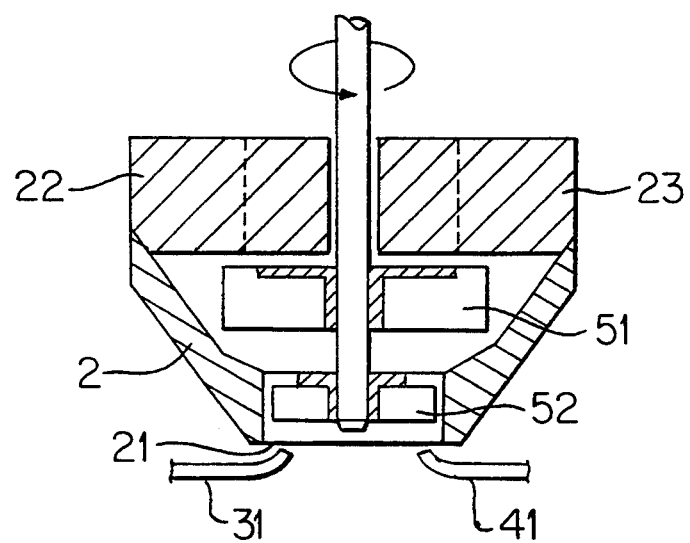

Although the mechanical stirrer used may be simple in that the draft tube illustrated in FIG. 1 is not used, it is preferable to use the draft tube to regulate the circulatory flow in the reactor to ensure higher efficiency of stirring. The impeller blade used may be of any type, such as the paddle type, turbine type and propeller type, and two or more impeller blades may be used. The use of two or more impeller blades is seen in the case where the stirring action is enhanced or the mixing of reaction solutions and the circulation of the bulk flow in the reactor are separately performed. An example of this case is illustrated in FIG. 2. When using no draft tube, it is more common to use a baffle in the reactor, which is effective in enhancing the stirring action. In this regard, detailed information is seen in literature in chemical engineering, including "Kagaku Kogaku Binran" (Maruzen, 5th ed., pp. 891–910).

Figure 3A:
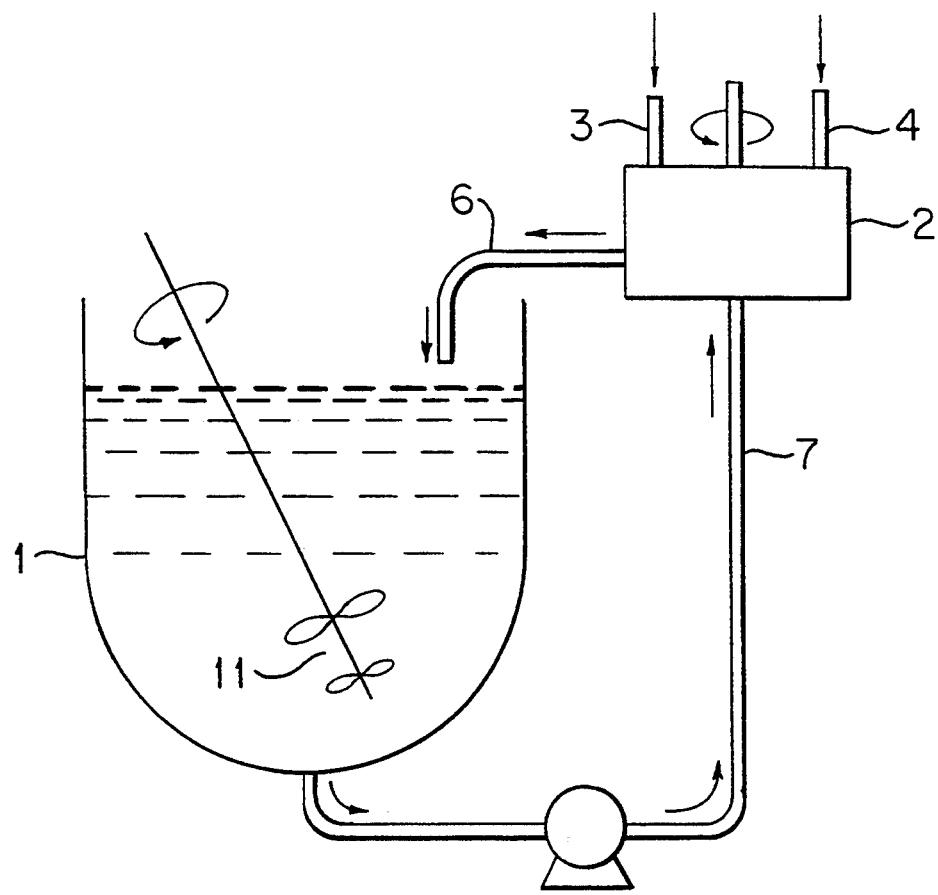
FIGS. 3 (a–c) are schematic diagrams of a circulatory batch type reaction apparatus.
Figure 3B:
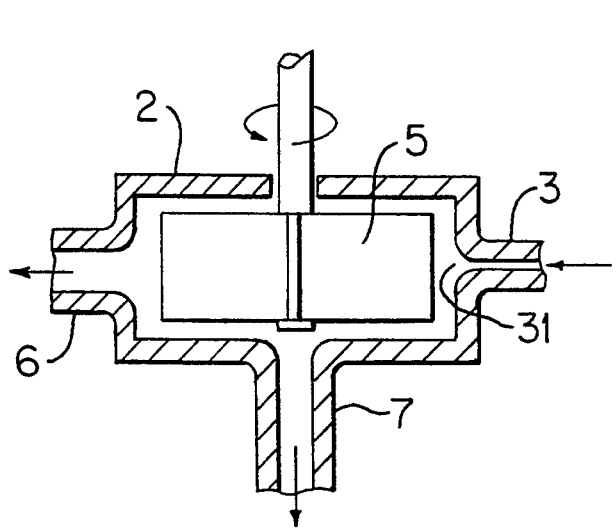
Figure 3C:
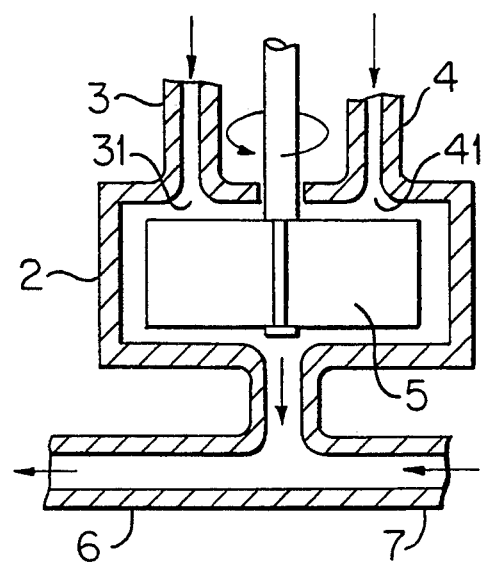

Although the reaction solutions may be added via the surface unlike the method of FIG. 1, it is preferable from the viewpoint of stable uniform mixing to add them in liquid system; it is more preferable to use the method disclosed in Japanese Patent O.P.I. Publication Nos. 67535/1984 and 160127/1987; it is still more preferable to add a single reaction solution in a plurality of separate injection systems as disclosed in Japanese Patent O.P.I. Publication No. 160128/1987. The position where the reaction solution is added is closely associated with the mechanical stirrer used. Accordingly, it is preferable to supply it via the lower part of draft tube when using an upper discharge type mechanical stirrer equipped with a draft tube and a 45° inclined turbine blade; its position should be located at the position of maximum flow rate, specifically in the vicinity of the outermost periphery of the impeller blade. For the lower discharge type, the position should be in the upper portion of the draft tube. Circulatory batch type FIG. 3 is a schematic diagram of a reaction apparatus of the circulatory batch type.

This type is based on the method in which an aqueous solution of protective colloid is circulated in the reactor from the bottom of the reactor by a pump, each reaction solution is supplied to a mixer provided in this circulatory system, and the reaction solutions are rapidly mixed in the mixer to prepare fine grains. With respect to the method of addition and the shape of the mixer, various options are possible as with the axial flow batch type. As a preferred mode of embodiment, it is preferable to supply a single reaction solution at a number of sites; and the addition apparatus described in Japanese Patent O.P.I. Publication No. 160127/1987 is recommended. With respect to the position of addition, the same applies as with the axial flow batch type. As for the mechanical stirrer in the mixer, circulation is achieved by a pump unlike the axial flow batch type; therefore, it can be selected from a wider range; it is preferable to use a paddle or turbine blade, which is based on shearing action, rather than propellers and inclined paddles, which are based on discharge action. As for the means of stirring in the reactor, it can be selected from a still wider range, since the reaction itself is not carried out thereby, but it is preferable to provide a baffle in the reactor or attach an inclined propeller blade to the reactor in consideration of bubble swirling etc. Another preferred method is to use a mixer as illustrated in FIG. 3 (c), a modification of the reactor of the circulatory batch type. This type is categorized under the following continuous inflow type.

Figure 4A:
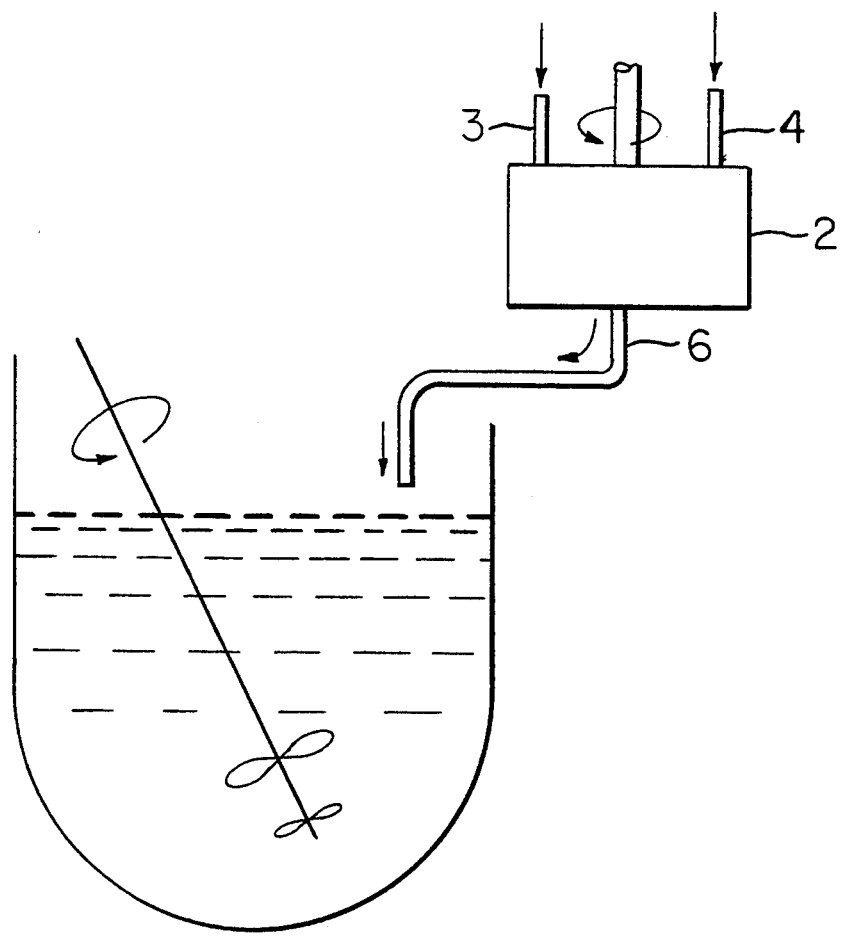
FIGS. 4 (a–b) are schematic diagrams of continuous inflow type reaction apparatus.
Figure 4B:
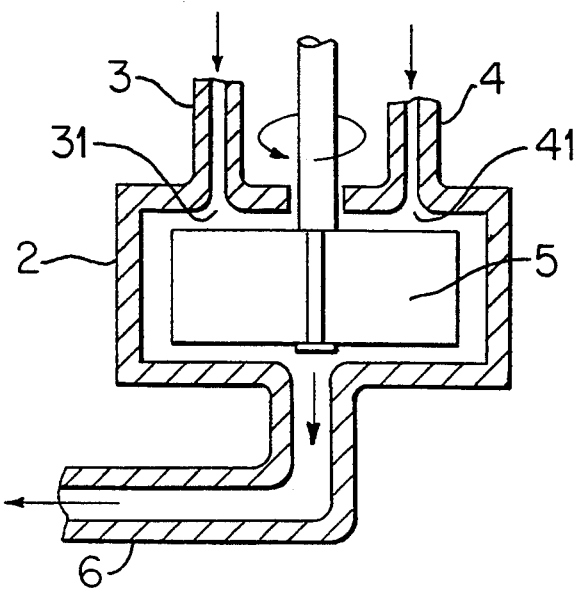

FIG. 4 is a schematic diagram of a continuous inflow type reaction apparatus.

With respect to the supplying means, mixer and reactor for reaction solutions, the same can be selected as with the reaction apparatus of the circulatory batch type.

The axial flow batch type and the circulatory batch type are both based on the double jet method, but they are accompanied by growth of fine grains because the grains are circulated during reaction. On the other hand, the continuous inflow type is the best choice to form very fine grains because it does not involve grain circulation. As illustrated in FIG. 4 (b), very uniform fine grains can be formed by releasing the mixture into the reactor. Although the object of the present invention can be accomplished by any of the above-mentioned apparatus types, it is very important to form grains under controlled reaction conditions suitable to the fine grains formed; inversely, various factors of each fine grain are determined according to production cost and capital cost, depending on which type of apparatus falling in the scope of the present invention is used. In any case, irrespective of the level of chemical sensitization, the present invention makes it possible to control the number and size of sensitivity specks, which cannot be achieved by conventional methods of chemical sensitization.

Accordingly, the fine grains of gold and/or silver chalcogenide of known composition, size and content ratio obtained by the present invention, as a liquid phase suspension system, are added to silver halide emulsion and seeded to silver halide crystals to allow free control of the distribution density of sensitivity specks, thus offering very great practical and technical advantages.

The silver halide emulsion subjected to seeding sensitization with said fine grains is applicable to any light-sensitive material, whether it is a negative or positive film, a black-and-white or color film, a printing process film, a printing paper, or an X-ray photographic film, and whether it is prepared by the acidic method, the neutral method or the ammoniacal method. The fine grains of the present invention are suitable to seeding due to affinity of sensitivity speck unit aggregates and silver halide ion crystals, and can be used universally, irrespective of the composition, crystalline system, crystal habit, grain size, dispersibility (mono- or polydispersion), grain structure (core/shell structure or uniform structure) of the silver halide.

EXAMPLES

The present invention is hereinafter described in more detail by means of the following examples, which are not to be construed as limitative on the present invention.

Example 1

| Solution A: | Sodium sulfide nonahydrate 0.2 mol/l solution | 100 cc |
|---|---|---|
| Solution B: | Silver nitrate 0.4 mol/l solution | 100 cc |
| Solution C: | Ossein gelatin | 10 g |

Distilled water was added to make a total quantity of 200 cc.

The gelatin used was ossein gelatin. Reaction apparatus: A reaction chamber having an inside capacity of about 600 cc and a semi-spherical base was used in combination with a 45° inclined paddle equipped with four impeller blades of 35 mm in diameter of the upper discharge type. To prevent vortex flow and bubble swirling, two baffles were attached.

Solution C was added to the reactor equipped with the impeller blades and stirred at constantly 35° C. at a stirring rotation rate of 650 rpm. Then, solutions B and A were simultaneously supplied to the mixer in the reactor over a period of 40 minutes, while keeping the pH and silver potential at 7.5 and −100 mV, respectively.

Example 2

Solutions A, B and C were prepared in the same manner as in Example 1.

Reaction apparatus:

A reactor having an inside capacity of about 600 cc and a semi-spherical base was used in combination with a 45° inclined paddle equipped with four impeller blades of over 35 mm in diameter of the upper discharge type and a draft tube (FIG. 1).

Solution C was added to the reactor equipped with the impeller blades and stirred at constantly 35° C. at a stirring rotation rate of 650 rpm. Then, solutions A and B were simultaneously supplied to the mixer in the reactor over a period of 40 minutes, while keeping the pH and silver potential at 7.5 and −100 mV, respectively.

Example 3

Solutions A and B were prepared in the same manner as in Example 1. 10 g of low molecular gelatin with an average molecular weight of 10000 was diluted with distilled water to yield 200 cc of solution C. The reaction apparatus used was the same as in Example 2.

Solution C was added to the reactor equipped with the impeller blades and stirred at constantly 10° C. at a stirring rotation rate of 650 rpm. Then, solutions A and B were simultaneously supplied to the mixer over a period of 40 minutes, while keeping the pH and silver potential at 8.0 and −100 mV, respectively.

Comparative Example 1

Solutions A, B and C were prepared in the same manner as in Example 1. The reaction apparatus used was the same as in Example 1.

Solution C was added to the reactor and stirred at constantly 35° C. at a stirring rotation rate of 650 rpm. Then, solution A was added, followed by several minutes of mixing, after which solution B was rapidly added.

Comparative Example 2

Solutions A, B and C were prepared in the same manner as in Example 1. The reaction apparatus used was the same as in Example 1.

Solution C was added to the reactor and stirred at constantly 35° C. at a stirring rotation rate of 650 rpm. Then, solution B was added, followed by several minutes of mixing, after which solution A was rapidly added.

Comparative Example 3

An experiment was made on the basis of Examples given in Japanese Patent O.P.I. Publication No. 198443/1990.

| Solution A: | Sodium nitrite pentahydrate 0.01 mol/l solution | 100 cc |
|---|---|---|
| Solution B: | Silver nitrate 0.01 mol/l solution | 200 cc |
| Solution C: | 4-hydroxy-6-methyl-1,3,3a, 7-tetrazaindene 0.073 mol/l solution | 20 cc |

Solutions A, B and C were cooled to 4° C. in ice water, after which solution A was added to the same reaction apparatus as in Example 1 and stirred. Then, composition B was rapidly added while keeping the temperature at 4° C., and solution C was added with stirring.

Comparative Example 4

An experiment was made with the same densities as in Examples 1 through 3 and Comparative Examples 1 and 2, since the grain density was low. Considering the expectation that sodium nitrite and silver nitrate react mutually in a ratio of 1 molecule of the former to 2 molecules of the latter, the total amount of reaction solutions was set at 2 times that used in Comparative Example 3.

| Solution A: | Sodium nitrite pentahydrate 0.4 mol/l solution | 100 cc |
|---|---|---|
| Solution B: | Silver nitrate 0.4 mol/l solution | 100 cc |
| Solution C: | 4-hydroxy-6-methyl-1,3,3a, 7-tetrazaindene 0.292 mol/l solution | 200 cc |

The grains prepared as above were evaluated by transmission electron microscopy. After grain formation, silver sulfide grains were sampled from the reactor and treated to remove the excess salts, after which the sample was dripped over a meshed plate for transmission electron microscopy. After drying, the sample was observed. The results are shown in Table 1.

TABLE 1

| Experiment No. | Grain No | Average grain size (Å) | Coefficient of variance (%) |
|---|---|---|---|
| Example 1 | UF-1 | 80 | 25 |
| Example 2 | -2 | 80 | 15 |
| Example 3 | -3 | 20 | 13 |
| Comparative Example 1 | -4 | 310 | broad |
| Comparative Example 2 | -5 | 497 | broad |
| Comparative Example 3 | -6 | 70 | broad |
| Comparative | -7 | 145 | broad |

TABLE 1-continued

| Experiment No. | Grain No | Average grain size (Å) | Coefficient of variance (%) |
| --- | --- | --- | --- |
| Example 4 | | | |

Average grain size and grain size distribution were determined for 1000 grains.

The samples of Comparative Examples 1 and 2 have a very broad distribution, comprising larger grains and smaller grains. It is therefore impossible to obtain their accurate average grain size because of a wide difference among view fields.

The sulfides thiourea and 1-thiazolylthiourea were used in solution; when grains were formed under conditions permitting their reaction, the grains formed had almost the same grain size and grain size distribution.

It is evident that fine grains with clearly uniform grain size distribution can be formed by controlling grain formation conditions, as stated above. Also, for controlling average grain size, it can be reduced by forming grains at low temperature as in Example 3. In that case, low molecular gelatin is used, since high molecular gelatin (molecular weight over 100000), in common use, sets at about 30° C. though the setting temperature varied depending on the molecular weight and kind thereof. This can also be achieved by regulating the concentration of various ions, as well as the feed rates and pH levels of the reaction solutions.

Some examples of formation of gold-silver complex sulfide are given below.

Example 4

Solutions B and C were prepared in the same manner as in Example 1. Separately, the following solutions A-1 and A-2 were prepared.

| Solution A-1: | Silver nitrate 0.3 mol/l solution 50 cc |
| --- | --- |
| Solution A-2: | Chloroauric acid (HAuCl$_4$) 0.1 mol/l solution 50 cc |

The reaction apparatus used was the same as in Example 2.

Solution C was added to the reactor equipped with the impeller blades and stirred at constantly 35° C. at a stirring rotation rate of 650 rpm. Next, solutions B, A-1 and A-2 were simultaneously supplied to the mixer in the reactor over a period of 40 minutes, while keeping the pH and silver potential at 7.5 and −100 mV, respectively.

Example 5

Solutions B and C were prepared in the same manner as in Example 1. Separately, the following solutions A-1 and A-2 were prepared.

| Solution A-1: | Silver nitrate 0.2 mol/l solution | 50 cc |
| --- | --- | --- |
| Solution A-2: | Chloroauric acid (HAuCl$_4$) 0.2 mol/l solution | 50 cc |

The reaction apparatus used was the same as in Example 2.

Solution C was added to the reactor equipped with the impeller blades and stirred at constantly 35° C. at a stirring rotation rate of 650 rpm. Next, solutions B, A-1 and A-2 were simultaneously supplied to the reactor over a period of 40 minutes, while keeping the pH and silver potential at 7.5 and −100 mV, respectively.

Example 6

Solutions B and C were prepared in the same manner as in Example 1. Separately, the following solutions A-1 and A-2 were prepared.

| Solution A-1: | Silver nitrate 0.35 mol/l solution | 50 cc |
| --- | --- | --- |
| Solution A-2: | Chloroauric acid (HAuCl$_4$) 0.05 mol/l solution | 50 cc |

The reaction apparatus used was the same as in Example 2.

Solution C was added to the reactor equipped with the impeller blades and stirred at constantly 35° C. at a stirring rotation rate of 650 rpm. Next, solutions B, A-1 and A-2 were simultaneously supplied to the reactor over a period of 40 minutes, while keeping the pH and silver potential at 7.5 and −100 mV, respectively.

The grains prepared as above were evaluated by transmission electron microscopy. After grain formation, silver sulfide grains were sampled from the reactor and treated to remove the excess salts, after which the sample was dripped over a meshed plate for transmission electron microscopy. After drying, the sample was observed. The results are shown in Table 2.

TABLE 2

| Experiment No. | Grain No. | Average grain size (Å) | Coefficient of variance (%) |
| --- | --- | --- | --- |
| Example 4 | UF-8 | 40 | 15 |
| Example 5 | -9 | 50 | 15 |
| Example 6 | -10 | 60 | 15 |

Average grain size and grain size distribution were determined for 1000 grains.

Application example

Results of seeding sensitization using fine grains obtained according to the present invention are described below.

Emulsion Em-A, used in the example, was prepared as follows.

Preparation of emulsion Em-A

| Aqueous solution a-1 | |
| --- | --- |
| Gelatin | 51.93 g |
| 28% aqueous ammonia | 1056 ml |
| 56% acetic acid | 1590 ml |

Water was added to make a total quantity of 11827 ml.

| Aqueous solution a-2 | |
| --- | --- |
| AgNO$_3$ | 1587 g |
| 28% aqueous ammonia | 1294 ml |

Water was added to make a total quantity of 2669 ml.

| Aqueous solution a-3 | |
| --- | --- |
| Gelatin | 34.93 g |
| KBr | 1454.7 g |

Water was added to make a total quantity of 3493 ml.

| | |
|---|---|
| Emulsion solution a-4 containing fine grains of AgI (average grain size 0.06 μm) Stock solution of fine grains of AgI (containing 45.6 g gelatin/mol AgI) (1467 ml/mol AgI) | 1239 ml |
| 4-hydroxy-6-methyl-1,3,3a,7-tetrazaindene | 5.22 g |

Water was added to make a total quantity of 2294 ml.

While vigorously stirring the aqueous solution a-1 with the above composition at a temperature of 60° C., a monodispersed silver iodobromide emulsion of 0.27 μm in average grain size containing 2 mol % silver iodide, in an amount equivalent to 0.407 mol, as seed grains, was added, and the mixture was adjusted to appropriate pH and pAg levels with acetic acid and an aqueous solution of KBr.

Then, while controlling the pH and pAg, aqueous solutions a-2, a-3 and a-4 were simultaneously added; the resulting emulsions were desalinized and washed.

A monodispersed emulsion Em-A, having an average grain size of 0.8 μm and an average silver iodide content of 8.0 mol %, was thus obtained.

Powder X-ray diffraction analysis identified this emulsion as having a core having an AgI content of 35 mol %.

A. Silver sulfide seeding sensitization

To the emulsion Em-A thus obtained, the abovementioned fine grains of silver sulfides UF-1 through UF-10 were added at $2.0 \times 10^{-6}$ mol/mol AgX to yield emulsions A-1 through A-7. For comparison, sulfur sensitization with sodium thiosulfate was conducted.

Specifically, $2.0 \times 10^{-6}$ mol/mol AgX sodium thiosulfate was added to emulsion Em-A, adjusted to a pAg of 8.0 and kept at 60° C., followed by ripening at 60° C. for 120 minutes. The resulting emulsion obtained by this conventional method is referred to as emulsion A-0. Emulsions A-0 through A-7 were spectrally sensitized with a combination of three sensitizing dyes.

Emulsions B-1 through B-7 and emulsions C-1 through C7 were prepared in the same manner as above except that the amount of UF-1 through UF-7 were increased to respectively 5 times and 10 times those for A-1 through A-7. For comparison, emulsions B-0 and C-0 were prepared in the same manner as above except that the amount of sodium thiosulfate was increased to respectively 5 times and 10 times that for A-0. The amounts of spectral sensitizers used in these emulsions were the same as with A-0 through A-7 without exception.

Next, a magenta coupler was added to these emulsions. After uniformly adding an appropriate amount of 2-hydroxy-4,6-dichlorotriazine sodium as a hardener, each emulsion was coated and dried on a subbed triacetate support to a final amount of silver coated to 2.0 g/m² to yield respective coated samples.

Each sample was subjected to exposure with green light through an optical wedge by an ordinary method and subjected to an ordinary color developing process, after which their photographic performance was evaluated.

The results are shown in Table 3. Figures for sensitivity are expressed in percent ratio based on the maximum sensitivity of comparative sample A-0.

TABLE 3

| Emulsion No. | Sensitivity | Foggin | Remark |
|---|---|---|---|
| A-0 | 100 | 0.10 | Conventional |
| A-1 | 65 | 0.09 | Inventive |
| A-2 | 70 | 0.07 | Inventive |
| A-3 | 120 | 0.06 | Inventive |
| A-4 | No sensitivity | 0.07 | Comparative |
| A-5 | No sensitivity | 0.07 | Comparative |
| A-6 | 30 | 0.3 | Comparative |
| A-7 | No sensitivity | 0.07 | Comparative |
| B-0 | 80 | 0.35 | Conventional |
| B-1 | 150 | 0.09 | Inventive |
| B-2 | 170 | 0.07 | Inventive |
| B-3 | 260 | 0.06 | Inventive |
| B-4 | No sensitivity | 0.09 | Comparative |
| B-5 | No Sensitivity | 0.09 | Comparative |
| B-6 | 30 | 0.50 | Comparative |
| B-7 | No Sensitivity | 0.09 | Comparative |
| C-0 | 60 | 0.50 | Conventional |
| C-1 | 100 | 0.09 | Inventive |
| C-2 | 140 | 0.07 | Inventive |
| C-3 | 185 | 0.06 | Inventive |
| C-4 | 30 | 0.09 | Comparative |
| C-5 | 40 | 0.09 | Comparative |
| C-6 | 20 | 0.6 | Comparative |
| C-7 | 50 | 0.09 | Comparative |

Sensitivity was defined as the reciprocal of the exposure amount which provides a density equivalent to fogging density +0.1.

As shown in Table 3, the fine grains of silver sulfide of the present invention have a clear sensitizing effect. Specifically, they were found photographically sensitive even at any dilution rate of 1, 5 and 10 times, while the comparative samples, except for A-6, B-6 and C-4 through C-7, had no sensitivity. The sensitivity obtained in the 10-times diluted sample is probably thanks to some contribution of a few fine grains among the grains with very broad distribution. A noticeable feature of the series of A-6, B-6 and C-6, all of which had sensitivity, is abnormally high fogging. This is probably because of the presence of excess silver nitrate, i.e., formation of silver nuclei, in forming the silver sulfide. Among the series of 1-, 5- and 10-times Samples, the most sensitive, relative to blanks, were A-3, B-3 and C-3, all of which are based on UF-3. It should be noted that the present invention undergoes no increase in fogging with the amount of reaction solutions added as found in conventional methods. This is one of the marked features of the present invention as to seeding sensitization with controlled number and size of grains.

B. Gold-silver complex sulfide seeding sensitization

An application of gold-silver complex sulfide is described below.

Emulsion Em-A, adjusted to a pAg of 8.0, was first subjected to the following sensitization for comparison.

While keeping the emulsion at 60° C., $2.0 \times 10^{-6}$ mol/mol AgX sodium thiosulfate was instantaneously added, followed by ripening for 60 minutes. Then, a mixture of $4.4 \times 10^{-7}$ mol/mol AgX chloroauric acid and ammonium thiocyanate was added, followed by additional ripening for 1 hour. Spectral sensitization was conducted using the same sensitizing dyes as with the above-mentioned emulsion A-0. The resulting emulsion, referred to as D-0, was treated in the same manner as above to yield a coated sample.

with respect to UF-8, 9 and 10, each was instantaneously added in the same manner as above, as dispensed so that the amount of silver was the same as with sodium thiosulfate in comparative emulsion D-0, followed by ripening for 120 minutes. Spectral sensitization was conducted in the same manner as above. The resulting emulsions, referred to as D-8, D-9 and D-10, respectively, were treated in the same manner as with emulsion A-0 to yield respective coated samples.

TABLE 4

| Emulsin No. | Sensitivity | Fogging | Remark |
|---|---|---|---|
| D-0 | 100 | 0.16 | Conventional |
| D-8 | 180 | 0.14 | Inventive |
| D-9 | 160 | 0.12 | Inventive |
| D-10 | 120 | 0.13 | Inventive |

Sensitivity was defined as the reciprocal of the exposure amount which provides a density equivalent to fogging density +0.1.

As seen from the results in Table 4, the use of the fine grains of gold and/or silver compound of the present invention offers higher photographic sensitivity and reduced fogging in comparison with the comparative emulsion samples.

Therefore, sensitivity control and sensitization can be achieved with no fogging by seeding sensitization of silver halide crystals with the ultrafine grains of sensitivity speck substance of the present invention formed in separate liquid suspension systems.

To summarize, the present invention is directed to provide an ultrafine gold and/or silver chalcogenide which can be used for the sensitivity speck seeding sensitization method, in which sensitivity speck substances with known size and composition prepared in separate liquid suspensions, are distributed at a given density on the silver halide crystal plane, and a method and apparatus for production thereof, wherein said chalcogenide, which is a sulfur compound, is produced by simultaneously adding a solution of a water-soluble gold compound and/or a silver compound and a solution of a water-soluble chalcogenide to a flowing protective colloid solution under reaction conditions selected according to the combination of the two seed solutions in a mixing ratio based on the reaction equivalence of the two seed solutions to yield a gold and/or silver chalcogenide with ultrafine grain size.

What is claimed is:

1. A method of producing a chalcogenide of at least one of gold and silver comprising the steps of:
    (a) preparing a first solution of at least one water soluble compound selected from the group consisting of silver nitrate, chloroauric acid, and gold dimethylrhodanine, and a mixture of chloroauric acid, and a second aqueous solution of a compound selected from the group consisting of hydrogen sulfide, alkali sulfide, thiourea, substituted thiourea, polysulfides, selenoureas and dithiacarbaminic acids;
    (b) simultaneously injecting the first and second solutions into a third protective colloid solution and rapidly mixing the first, second and third solutions, wherein the mixing is effected to produce a chalcogenide product having an average particle size of not more than 60 Å and a coefficient of variation of less than 0.16; and
    (c) recovering particles of the resulting chalcogenide product.

2. The method of claim 1, wherein the second solution is a sulfide solution.

3. The method of claim 1, wherein the first solution is an aqueous solution of a gold or silver compound, the second solution is an aqueous solution of a sulfide, and the protective colloid in the third solution is one or more gelatins present in a concentration of not less than 1% by weight.

4. The method of claim 1, wherein the protective colloid in the third solution is a gelatin.

5. The method of claim 4, wherein the protective colloid concentration in the third solution is not less 1% by weight.

6. The method of claim 4, wherein the protective colloid concentration in the third solution is not less than 5% by weight.

* * * * *